(12) United States Patent
Ishizuka et al.

(10) Patent No.: US 12,059,900 B2
(45) Date of Patent: Aug. 13, 2024

(54) METHOD FOR MANUFACTURING LIQUID EJECTION HEAD AND LIQUID EJECTION HEAD

(71) Applicant: CANON KABUSHIKI KAISHA, Tokyo (JP)

(72) Inventors: Kazunari Ishizuka, Suntou-gun (JP); Isamu Horiuchi, Yokohama (JP); Satoshi Tsutsui, Yokohama (JP); Yohei Hamade, Tokyo (JP); Miho Ishii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 876 days.

(21) Appl. No.: 16/935,441

(22) Filed: Jul. 22, 2020

(65) Prior Publication Data
US 2021/0031523 A1 Feb. 4, 2021

(30) Foreign Application Priority Data

Aug. 2, 2019 (JP) .................. 2019-142721
Jul. 7, 2020 (JP) .................. 2020-116925

(51) Int. Cl.
*B41J 2/16* (2006.01)
*B41J 2/14* (2006.01)
*C08J 7/16* (2006.01)

(52) U.S. Cl.
CPC ......... *B41J 2/1607* (2013.01); *B41J 2/14201* (2013.01); *C08J 7/16* (2013.01); *B41J 2202/22* (2013.01); *C08J 2363/00* (2013.01)

(58) Field of Classification Search
None
See application file for complete search history.

(56) References Cited

U.S. PATENT DOCUMENTS

| 5,478,606 A | 12/1995 | Ohkuma et al. |
| 8,444,253 B2 | 5/2013 | Horiuchi et al. |
| 9,139,005 B2 | 9/2015 | Nagaoka et al. |
| 10,363,746 B2 | 7/2019 | Ishizuka |
| 2013/0323650 A1* | 12/2013 | Horiuchi ............... H04R 3/02 430/320 |

FOREIGN PATENT DOCUMENTS

| JP | 6-286149 A | 10/1994 |
| JP | 2001-348444 A | 12/2001 |
| JP | 2001348444 A * | 12/2001 |

* cited by examiner

Primary Examiner — Jose I Hernandez-Kenney
(74) Attorney, Agent, or Firm — Venable LLP

(57) ABSTRACT

Provided is a method for manufacturing a liquid ejection head including an ejection orifice for ejecting a liquid, a substrate and a flow path forming member that is joined to the substrate to form a liquid flow path communicating with the ejection orifice, the method including: (1) forming a resin layer having a flow path mold pattern, on the substrate; (2) adding a hydrophilizing material represented by Chemical Formula 1 to an entire surface layer of the resin layer; (3) forming a covering resin layer serving as the flow path forming member, on the resin layer and forming a compatible layer containing the resin layer, the covering resin layer and the hydrophilizing material, at an interface between the resin layer and the covering resin layer; (4) forming the ejection orifice by exposing the covering resin layer; and (5) forming a flow path by removing the resin layer.

9 Claims, 3 Drawing Sheets

METHOD FOR MANUFACTURING LIQUID EJECTION HEAD AND LIQUID EJECTION HEAD

BACKGROUND OF THE INVENTION

Field of the Invention

The present invention relates to a liquid ejection head that ejects a liquid onto a recording medium to perform recording and a method for manufacturing the same.

Description of the Related Art

Examples of a recording system using a liquid ejection head that ejects a liquid include an ink jet recording system (liquid jetting recording system) in which an ink is ejected onto a recording medium to perform recording.

An ink jet head applied to the ink jet recording system generally includes a fine ejection orifice, a liquid flow path and a plurality of energy generating elements that is provided on a part of the liquid flow path and generates energy to be used for ejecting liquid. Examples of a method for producing such an ink jet head include a method described in Japanese Patent Application Laid-Open No. H06-286149. First, a pattern of an ink flow path is formed of a soluble resin on a substrate on which the energy generating elements are formed. Then, a covering resin layer that forms the ink flow path and contains an epoxy resin and a photocationic polymerization initiator is formed on the ink flow path pattern and an ejection orifice is formed on the energy generating elements by photolithography. In the method, the soluble resin is eluted and the covering resin layer as the ink flow path is cured finally.

In recent years, an ink has been diversified along with higher image quality and diversification of media. For example, regarding an ink with high surface tension, since a wetting property to the ink flow path is low, refilling deteriorates. Alternatively, ink ejection failure may occur due to the accumulation of bubbles in the flow path and printing may be affected particularly in a high-precision head that will eject small droplets.

As described above, the method for manufacturing an ink jet head has a technical problem that an ink ejection failure occurs depending on an ink used, particularly when an extremely small ejection orifice is produced.

To address the technical problem, Japanese Patent Application Laid-Open No. 2001-348444 discloses that when bringing an aqueous solution of 2-methacryloyloxyethyl phosphorylcholine into contact with the inside of the flow path of the ink jet head, the inside of the flow path can be made hydrophilic and accumulation of ink bubbles can be suppressed.

SUMMARY OF THE INVENTION

The present invention provides a method for manufacturing a liquid ejection head including an ejection orifice for ejecting a liquid, a substrate on which an energy generating element for ejecting the liquid is formed and a flow path forming member that is joined to the substrate to form a liquid flow path communicating with the ejection orifice and having the energy generating element therein, the method including:
(1) forming a resin layer having a pattern serving as a mold of the liquid flow path, on the substrate on which the energy generating element is formed;
(2) adding a hydrophilizing material represented by Chemical Formula 1 to an entire surface layer of the resin layer;
(3) forming a covering resin layer serving as the flow path forming member, on the resin layer and forming a compatible layer containing a resin forming the resin layer, a resin forming the covering resin layer and the hydrophilizing material, at an interface between the resin layer and the covering resin layer;
(4) forming the ejection orifice in the covering resin layer; and
(5) forming the liquid flow path by removing the resin layer.

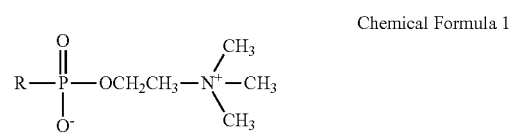

Chemical Formula 1

(R represents a hydrocarbon group and may contain at least one of an O atom and an N atom.)

The present invention also provides a liquid ejection head including:
an ejection orifice for ejecting a liquid;
a substrate on which an energy generating element for ejecting the liquid is formed; and
a liquid flow path formed of the substrate and a flow path forming member that is joined to the substrate, in which the liquid flow path communicating with the ejection orifice and having the energy generating element therein,
in which the liquid flow path surface of the flow path forming member includes a layer containing a positive photosensitive resin, a covering resin serving as the flow path forming member and a hydrophilizing material represented by Chemical Formula 1.

Further features of the present invention will become apparent from the following description of exemplary embodiments with reference to the attached drawings.

DESCRIPTION OF THE EMBODIMENTS

According to a study by the present inventors, it was confirmed that, in the method described in Japanese Patent Application Laid-Open No. 2001-348444, a hydrophilicity inside a flow path in the initial state is developed, but sustainability thereof is poor.

An object of the present invention is to solve the problem in the background art and to provide a liquid ejection head capable of performing favorable ejection for a long time even when an extremely small ejection orifice is produced.

Therefore, the present inventors have conducted extensive studies to solve the problems in the background art and to achieve the object. As a result, it was found that providing a compatible layer formed of a resin layer forming an ink flow path shape and an ink flow path forming material, on an ink flow path surface and fixing a hydrophilizing material to the compatible layer enable the sustainability of the hydrophilicity of the ink flow path surface to increase.

Hereinafter, the present invention will be specifically described with reference to the drawings.

Figure 1:
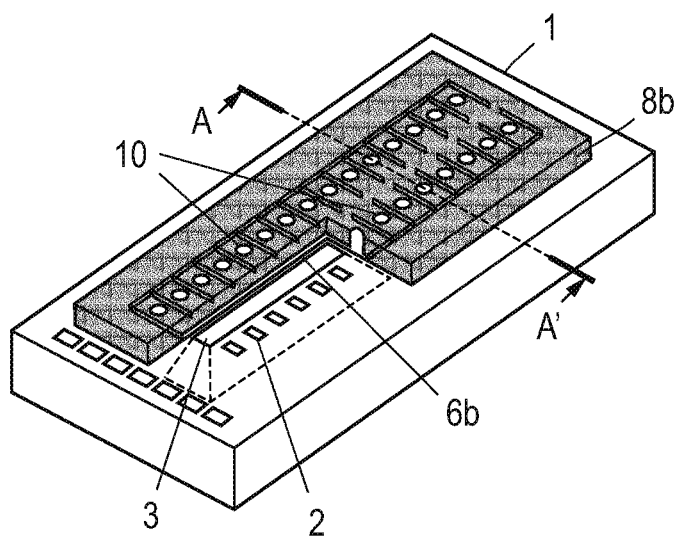
FIG. 1 is a schematic perspective view illustrating an ink jet head according to an embodiment of the present invention.
Figure 2:
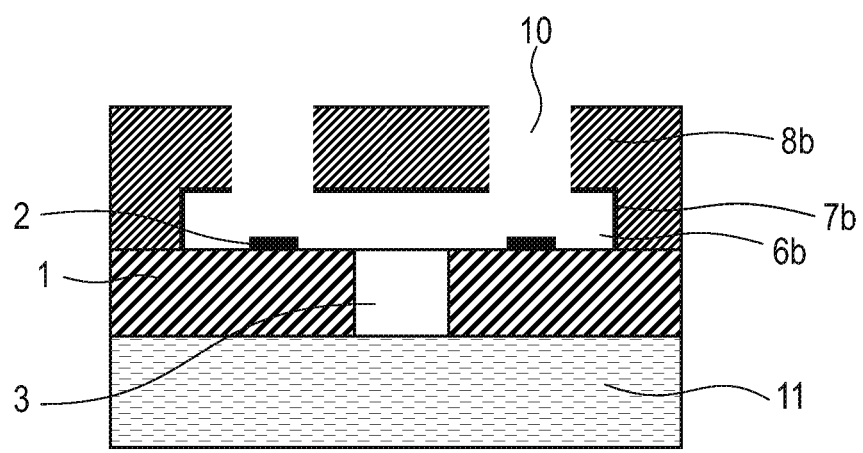
FIG. 2 is a schematic cross-sectional view as seen in a cross section perpendicular to the substrate, taken along the line A-A' in FIG. 1.

FIG. 1 is a schematic perspective view illustrating an ink jet head according to an embodiment of the liquid ejection head of the present invention. FIG. 2 is a schematic cross-sectional view as seen in a cross section perpendicular to a substrate, taken along the line A-A' in FIG. 1.

The ink jet head according to the present embodiment includes a substrate 1 in which energy generating elements 2 that generate energy to be used for ejecting a liquid (an ink) to be ejected are formed in two rows at a predetermined pitch. The substrate 1 can be formed of, for example, a single crystal of silicon (Si). A supply port 3 formed by anisotropically etching the substrate 1 is opened between the two rows of energy generating elements 2 in the substrate 1. A flow path forming member 8b is disposed on the substrate 1. The flow path forming member 8b on the substrate forms an individual liquid flow path (hereinafter, simply referred to as "flow path") 6b that communicates from the supply port 3 to each ejection orifice 10. The flow path forming member 8b that also functions as an ejection orifice forming member forms the ejection orifice 10 provided at a position facing each energy generating element 2. The position of the ejection orifice 10 is not limited to the position facing the energy generating element 2. A member 11 for supplying an ink is disposed on a lower surface of the substrate 1 and an ink is supplied from the member to the supply port 3 through a path (not shown).

A compatible layer 7b described later is formed on a surface of the flow path forming member 8b facing the flow path 6b.

The ink jet head is disposed so that the surface on which the ejection orifice 10 is formed faces a recording surface of a recording medium. Then, energy generated by the energy generating element 2 present in the flow path is used for the ink with which a flow path inside is filled through the supply port 3 to eject an ink droplet from the ejection orifice 10. Recording is performed by attaching the ink droplet to the recording medium. Examples of the energy generating element 2 include an electrothermal conversion element (so-called heater) as an element using thermal energy and a piezoelectric element as an element using mechanical energy. However, the energy generating element 2 is not limited thereto.

Next, an example of a method for manufacturing an ink jet head according to an embodiment of the present invention will be described with reference to FIGS. 3A to 3H.

FIGS. 3A to 3H are schematic cross-sectional views illustrating an example of the method for manufacturing an ink jet head according to the present embodiment, according to steps. A position of the cross-section is the same as that in FIG. 2.

Figure 3A:
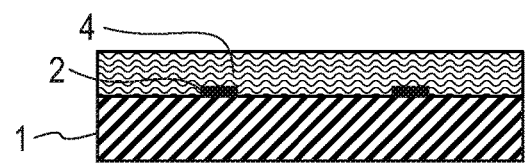
FIGS. 3A, 3B, 3C, 3D, 3E, 3F, 3G and 3H are schematic cross-sectional views illustrating an example of a method for manufacturing an ink jet head according to an embodiment of the present invention, according to steps.

First, as shown in FIG. 3A, the substrate 1 having the energy generating element 2 on a surface thereof is prepared. As long as the substrate functions as a part of a member forming the flow path 6b and also functions as a support of the flow path forming member 8b forming the flow path 6b (described later) and the ejection orifice 10, the substrate can be used without any particular limitation on a shape and a material thereof. In the present embodiment, a substrate formed of a silicon single crystal is used in order to form the supply port 3 penetrating the substrate by anisotropic etching described later.

On the substrate 1, a desired number of electrothermal conversion elements or piezoelectric elements are disposed as the energy generating elements 2. The energy for ejecting the ink droplet is applied to the ink by the energy generating element 2 to perform recording. For example, when the electrothermal conversion element is used as the energy generating element 2, the element heats the recording liquid in the vicinity so as to cause the ink state to change and generate ejection energy. Also, for example, when the piezoelectric element is used, the element vibrates mechanically so as to generate the ejection energy.

A control signal input electrode (not shown) for operating the energy generating element 2 is connected to these energy generating elements 2.

Various functional layers such as a protective layer (not shown) for improving durability of these energy generating elements 2 and an adhesion improving layer (not shown) for improving the adhesion between the flow path forming member and the substrate may be provided.

A positive photosensitive resin layer 4 is formed on the substrate 1 including the energy generating element 2. A general-purpose solvent coating method such as spin coating or slit coating can be applied to form the positive photosensitive resin layer 4.

Examples of the positive photosensitive resin include a poly(methyl isopropenyl ketone) resin, poly(methyl methacrylate) resin and other vinyl ketone resins which are capable of patterning by Deep UV.

Figure 3E:
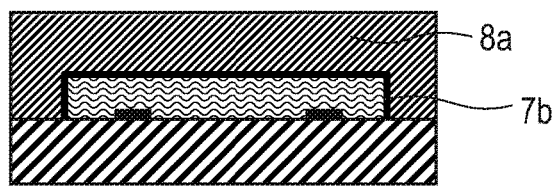
Figure 3B:
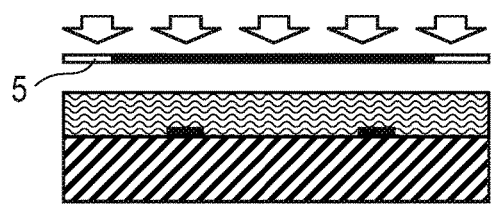
Figure 3F:
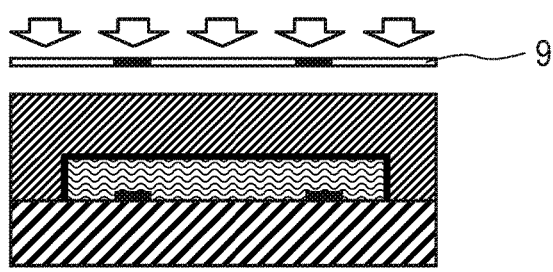
Figure 3C:

Next, as shown in FIGS. 3B and 3C, a photomask 5 is used to pattern the positive photosensitive resin layer 4 by a photolithography step to form a resin layer (a pattern 6a) serving as a mold of the ink flow path.

Figure 3G:
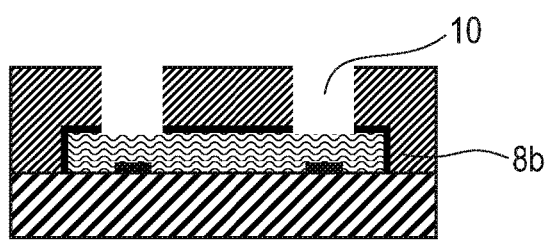
Figure 3D:
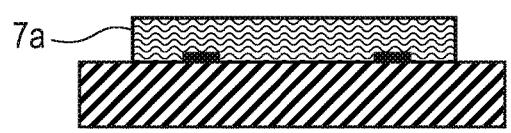

Next, as shown in FIG. 3D, the hydrophilizing material 7a, which is the feature of the present invention, is added to the entire surface layer of the flow path pattern 6a serving as the mold of the ink flow path. The hydrophilizing material 7a is preferably added to the pattern 6a by impregnation using a solvent. The hydrophilizing material 7a will be described later.

As shown in FIG. 3E, a covering resin layer serving as the flow path forming member 8b, specifically, a negative photosensitive resin layer 8a is formed on the resin layer forming the flow path pattern 6a formed on the substrate 1 as described above, by a method such as a spin coating method, a roll coating method, or a slit coating method.

Then, when the negative photosensitive resin layer 8a is formed, baking is performed. However, during the baking, a compatible layer 7b containing the hydrophilizing material 7a is formed between the pattern 6a and the negative photosensitive resin layer 8a. The solvent in the covering resin layer made of the negative photosensitive resin dissolves the surface layer of the resin layer forming the pattern 6a to form a layer, which is the compatible layer 7b. That is, the compatible layer 7b in this case is a layer in which the resin forming the pattern 6a on the negative photosensitive resin layer and the hydrophilizing material 7a are incorporated. That is, the compatible layer 7b is formed at the interface between the resin layer and the covering resin layer (the liquid flow path surface of the flow path forming member) and is adapted to include the resin forming the resin layer, the resin forming the covering resin layer and the hydrophilizing material.

This negative photosensitive resin is required to have high mechanical strength as a structural material, adhesion to a base, ink resistance and resolution for patterning a fine pattern of the ejection orifice, simultaneously. As a material satisfying these characteristics, a resin composition containing a photocurable epoxy resin, particularly a cationic polymerization type epoxy resin can be preferably used.

As the epoxy resin, for example, a reaction product having a molecular weight of about 900 or more among reaction products of bisphenol A and epichlorohydrin, a reaction product of bromine-containing bisphenol A and epichlorohydrin can be used. A reaction product of phenol novolac or o-cresol novolac and epichlorohydrin can also be used. However, the epoxy resin is not limited to the compounds. For the epoxy resin, it is suitable to use a compound which has preferably an epoxy equivalent of 2000 or less and more preferably an epoxy equivalent of 1000 or less. This is because when the epoxy equivalent is more than 2,000, the crosslink density decreases during the curing reaction, which may cause problems in adhesion and ink resistance.

As the photocationic polymerization initiator for curing the epoxy resin, a compound that generates an acid upon irradiation with light can be used. Although such a compound is not particularly limited, for example, an aromatic sulfonium salt or an aromatic iodonium salt can be used. Examples of the aromatic sulfonium salt can include TPS-102, 103, 105, MDS-103, 105, 205, 305 and DTS-102, 103 (all are product names) commercially available from Midori Kagaku Co., Ltd. Further, examples of the aromatic sulfonium salt can include SP-170, 172 (both are product names) commercially available from Adeka Corporation. As the aromatic iodonium salt, DPI-105, MPI-103, 105 and BBI-101, 102, 103, 105 (all are product names) commercially available from Midori Kagaku Co., Ltd. can be suitably used. The amount of the cationic photopolymerization initiator to be added can be set to any amount so as to obtain a target sensitivity. However, it is particularly suitable to use the cationic photopolymerization initiator in the range of 0.5 to 5 wt % with respect to the epoxy resin. In addition, as a wavelength sensitizer, SP-100 (product name) commercially available from Adeka Corporation may be added and used as needed.

Furthermore, additives can be appropriately added to the above composition as needed. For example, a flexibility-imparting agent may be added for the purpose of lowering the elastic modulus of the epoxy resin, or a silane coupling agent may be added for obtaining further adhesion with the base.

Next, as shown in FIG. 3F, pattern exposure is performed through the photomask 9 and development processing is performed to form the flow path forming member 8*b* and the ejection orifice 10 as shown in FIG. 3G. In this case, the compatible layer 7*b* containing the negative photosensitive resin is solidified similarly.

Figure 3H:
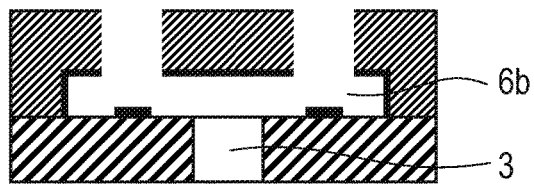

Next, as shown in FIG. 3H, the supply port 3 for an ink, penetrating the substrate 1 is formed and the pattern 6*a* serving as the mold of the ink flow path is removed to form the flow path 6*b* of the ink. In this case, the compatible layer 7*b* is not removed like the pattern 6*a* and is present on the surface of the flow path forming member 8*b* facing the flow path 6*b*.

Further, a heat treatment is performed as needed, joining for members for ink supply (not shown) and electrical joining (not shown) for driving the energy generating element 2 are performed to form the ink jet head.

Next, the hydrophilizing material 7*a* used in the manufacturing method of the present invention will be described. The hydrophilizing material 7*a* is a compound having a structure represented by Chemical Formula 1, has a phosphorylcholine group that exhibits hydrophilicity and is capable of being adsorbed to a resin or the like by unpaired electrons of P or N in the structure.

However, when the hydrophilizing material 7*a* is fixed to the resin only by the adsorption of the unpaired electrons of P or N, a fixability is weak and the sustainability of the hydrophilicity is poor. Therefore, the hydrophilizing material 7*a* is incorporated into the compatible layer 7*b*.

There are the following four methods for sufficiently incorporating the hydrophilizing material 7*a* into the compatible layer 7*b*. The first method indicates that the hydrophilizing material 7*a* is sufficiently fixed to the pattern 6*a* serving as the mold of the ink flow path. In this method, the hydrophilizing material 7*a* having the same functional group as the functional group of the pattern 6*a* serving as the mold of the ink flow path, that is, of the positive photosensitive resin 4 is selected. For example, when a poly(methyl isopropenyl ketone) resin having a carbonyl group (a methacryloyloxy group) is used as the positive photosensitive resin 4, a functional group having a carbonyl group is preferably used as R in Chemical Formula 1, for the hydrophilizing material 7*a*. In this case, as R in Chemical Formula 1, a functional group having a carbonyl group (a methacryloyloxy group) represented by Chemical Formula 2 can be selected.

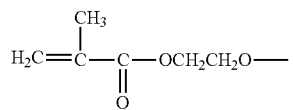

Chemical Formula 2

In addition, examples of the method for sufficiently fixing the hydrophilizing material 7*a* to the pattern 6*a* serving as the mold of the ink flow path include a method for mixing the hydrophilizing material 7*a* with the positive photosensitive resin 4 in advance. Then, the resin layer forming the pattern 6*a* serving as the mold of the ink flow path is formed to contain the hydrophilizing material 7*a*.

The second method indicates that the hydrophilizing material 7*a* is sufficiently fixed to the flow path forming member 8*b*. Examples of this method include a method in which the hydrophilizing material 7*a* having the same functional group as the functional group of flow path forming member 8*b*, that is, the functional group of the resin contained in the negative photosensitive resin layer 8*a* (functional group contained in the monomer of the resin contained in the negative photosensitive resin layer 8*a*). For example, when an epoxy group is used as the functional group of the negative photosensitive resin layer 8*a* (functional group contained in the monomer of the resin contained in the negative photosensitive resin layer 8*a*), a functional group having an epoxy group represented by Chemical Formula 3 can be selected as R in Chemical Formula 1, for the hydrophilizing material 7*a*.

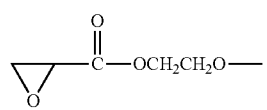

Chemical Formula 3

The third method is, for example, a method in which a solvent capable of dissolving the surface layer of the pattern 6a serving as the mold of the ink flow path is used as the solvent of the negative photosensitive resin, when forming the negative photosensitive resin layer 8a. For example, when a poly(methyl isopropenyl ketone) is used as the positive photosensitive resin 4, a solvent such as xylene or a methyl isobutyl ketone, preferably the methyl isobutyl ketone, can be selected.

Lastly, the fourth method is, for example, a method in which a temperature at which the surface layer of the pattern 6a serving as the mold of the ink flow path can be dissolved is selected as the baking temperature when forming the negative photosensitive resin layer 8a. For example, when the poly(methyl isopropenyl ketone) is used as the positive photosensitive resin 4, the temperature can be raised to about 90° C.

However, in the third and fourth methods, it is necessary to select the solvent and the temperature within a range in which a target shape of the pattern 6a serving as the mold of the ink flow path can be maintained.

In addition, in the method of adding the hydrophilizing material 7a to the pattern 6a serving as the mold of the ink flow path, for example, a poly(methyl isopropenyl ketone) resin can be used as the positive photosensitive resin 4. In this case, as an addition method, there is a spin coating method using a solution obtained by dissolving about 0.01% to 10% by mass of the hydrophilizing material 7a in alcohol such as isopropyl alcohol.

When the concentration of the hydrophilizing material 7a in the solution is less than 0.01% by mass, there is a concern that the hydrophilicity of surface of the ink flow path may be poorly developed. Also, when the concentration of the hydrophilizing material 7a in the solution is more than 10% by mass, a viscosity of the solution increases and there is a concern that the solution cannot be uniformly applied onto the pattern 6a serving as the mold of the ink flow path. However, the concentration range is not limited thereto, because the concentration depends on the desired hydrophilicity.

The hydrophilizing material represented by Chemical Formula 1 is not particularly limited as long as the material has the structure of Chemical Formula 1 and R is a hydrocarbon group which may contain at least one of an O atom and an N atom.

Examples of the hydrocarbon group represented by R include a group having no O atom and N atom, for example, an alkyl group such as $CH_3(CH_2)_{15}$—, other than the group having the carbonyl group represented by Chemical Formula 2 or the group having the epoxy group represented by Chemical Formula 3. Also, examples of the group containing an N atom include a group such as $(CH_3)_2$—CH—N$(CH_3)_2$—. Further, examples of the group containing both an O atom and an N atom include such as $(CH_3)_2$—CH—N$(CH_3)_2$—$OCH_2CH_2O$—.

The method for manufacturing an ink jet head according to the present invention as described above enables the hydrophilicity of the surface of the ink flow path to be maintained and the ink jet head capable of ejecting an ink favorably to be manufactured even when an extremely small ejection orifice is produced.

EXAMPLES

Examples are shown below and the present invention will be further described.

<<Water Repellency Evaluation>>

Example 1

A poly(methyl isopropenyl ketone resin) solution was applied to a silicon substrate 1 formed of a silicon single crystal by spin coating and then baking was performed at 120° C. for 6 minutes to produce the positive photosensitive resin layer 4. (FIG. 3A). A film thickness of the layer was 10 μm. Thereafter, the positive photosensitive resin layer 4 was patterned using the photomask 5. A Deep-UV exposure device UX-3300 (manufactured by Ushio, Inc.) was used as an exposure device and pattern exposure was performed at an exposure amount of 15 J/cm² (FIG. 3B). Thereafter, paddle development was performed with a methyl isobutyl ketone for 60 seconds and then shower rinse treatment with isopropyl alcohol was performed for 30 seconds to form the pattern 6a serving as the mold of the ink flow path (FIG. 3C).

Thereafter, a solution obtained by dissolving 1% by mass of a hydrophilizing material represented by Chemical Formula 4 in isopropyl alcohol was applied to the pattern by spin coating and then baking was performed at 90° C. for 3 minutes to fix the hydrophilizing material (FIG. 3D).

Chemical Formula 4

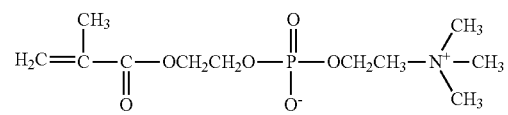

Next, the negative photosensitive resin composition described in Table 1 was applied and then baked at 90° C. for 9 minutes to form the negative photosensitive resin layer 8a (FIG. 3E). A film thickness of the negative photosensitive resin layer 8a was 20 μm on the substrate 1 and 10 μm on the pattern 6a.

TABLE 1

| Negative photosensitive resin composition | | | | | |
|---|---|---|---|---|---|
| Epoxy resin | | Photocationic polymerization initiator | | Solvent | |
| Name | Mixing amount (Parts by mass) | Name | Mixing amount (Parts by mass) | Name | Mixing amount (Parts by mass) |
| EHPE-3150 (Daicel Corporation) | 50 | SP-172 (Adeka Corporation) | 1 | Xylene | 50 |

Next, the negative photosensitive resin layer 8a was patterned using the photomask 9 so as to form the ejection orifice 10 (FIG. 3F). An i-line stepper FPA-3000i5+ manufactured by Canon Inc. was used as the exposure device and pattern exposure was performed at an exposure amount of 5000 J/m². Thereafter, developing with the methyl isobutyl ketone and rinsing with xylene were performed and then a heat treatment was performed at 100° C. for 60 minutes. As described above, the flow path forming member 8b having the ejection orifice 10 was formed (FIG. 3G).

Next, an etching mask (not shown) was formed on a back surface of the substrate to be processed and the silicon substrate 1 was anisotropically etched to form the supply port 3 for an ink. Thereafter, the entire surface was exposed through the negative resist at an exposure amount of 250,000 mJ/cm$^2$ using the Deep-UV exposure device UX-3300 (manufactured by Ushio, Inc.) to solubilize the pattern 6a. Subsequently, immersion was performed with methyl lactate while applying ultrasonic waves thereto and the flow path 6b for an ink was formed by dissolving and removing the pattern 6a (FIG. 3H).

Thereafter, the flow path forming member 8b was peeled off from the silicon substrate 1 to produce a contact angle measurement sample.

A contact angle was measured with pure water on the compatible layer 7b (FIG. 3H) and an ink having the following composition was prepared in addition to the initial state immediately after forming the sample. The contact angle after immersing the sample in the ink at 60° C. for 1 week was also measured. Hereinafter, the contact angle in examples shows the contact angle measured with the pure water.

(Ink Composition)
Pure water/diethylene glycol/isopropyl alcohol/lithium acetate/black dye food black 2=79.4/15/3/0.1/2.5

Table 3 shows the results of measuring the contact angle.

Example 2

A mixed solution of a poly(methyl isopropenyl ketone) resin and the hydrophilizing material 7a represented by Chemical Formula 4 was applied to the silicon substrate 1 by spin coating and then baking was performed at 120° C. for 6 minutes to produce the positive photosensitive resin layer 4. (FIG. 3A). 1% by mass of the hydrophilizing material 7a was added to a poly(methyl propenyl ketone). A film thickness of the layer was 10 μm. Thereafter, the Deep-UV exposure device UX-3300 (manufactured by Ushio, Inc.) was used and pattern exposure was performed at an exposure amount of 15 J/cm$^2$ (FIG. 3B). Thereafter, paddle development was performed with a methyl isobutyl ketone for 60 seconds and then shower rinse treatment with isopropyl alcohol was performed for 30 seconds to form the pattern 6a serving as the mold of the ink flow path (FIG. 3C).

Next, the negative photosensitive resin composition described in Table 1 was applied and then baked at 90° C. for 9 minutes to form the negative photosensitive resin layer 8a (FIG. 3E). A film thickness of the negative photosensitive resin layer 8a was 20 μm on the substrate 1 and 10 μm on the pattern 6a. After that, a contact angle measurement sample was produced and the contact angle was measured in the same manner as in Example 1.

Example 3

Except that a material represented by Chemical Formula 5 was used as the hydrophilizing material 7a, the contact angle measurement sample was produced and the contact angle was measured in the same manner as in Example 1.

Chemical Formula 5

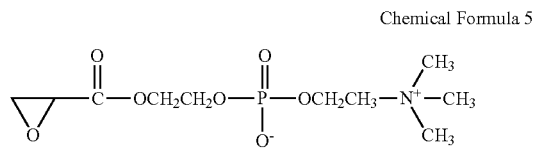

Example 4

Except that a composition described in Table 2 was used as the negative photosensitive resin composition, the contact angle measurement sample was produced and the contact angle was measured in the same manner as in Example 1.

TABLE 2

| Negative photosensitive resin composition | | | | | |
|---|---|---|---|---|---|
| Epoxy resin | | Photocationic polymerization initiator | | Solvent | |
| Name | Mixing amount (Parts by mass) | Name | Mixing amount (Parts by mass) | Name | Mixing amount (Parts by mass) |
| EHPE-3150 (Daicel Corporation) | 50 | SP-172 (Adeka Corporation) | 1 | Methyl isobutyl ketone | 50 |

Example 5

Except that the baking temperature when forming the negative photosensitive resin layer 8a was set to 70° C., the contact angle measurement sample was produced and the contact angle was measured in the same manner as in Example 1.

Example 6

Except that a material represented by Chemical Formula 6 was used as the hydrophilizing material, the contact angle measurement sample was produced and the contact angle was measured in the same manner as in Example 1.

Chemical Formula 6

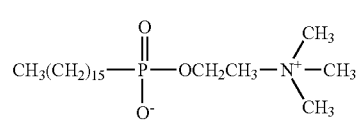

Comparative Example 1

Except that the hydrophilizing material was not used, the contact angle measurement sample was produced and the contact angle was measured in the same manner as in Example 1.

Comparative Example 2

Comparative Example 2 was carried out according to Japanese Patent Application Laid-Open No. 2001-348444. A contact angle measurement sample produced in Comparative Example 1 was immersed for one minute in a solution obtained by dissolving 1% by mass of the hydrophilizing material represented by Chemical Formula 4 in the isopropyl alcohol. Then, the contact angle of the sample that was dried at room temperature was measured. The contact angle was measurement in the same as in Example 1.

TABLE 3

| | Addition of hydrophilizing material | | Formation of negative photosensitive resin layer | | Contact angle | |
|---|---|---|---|---|---|---|
| | Material | Process | Solvent | Baking temperature | Initial | after immersion in ink |
| Example 1 | Chemical Formula 4 | Application to pattern 6a | Xylene | 90° C. | 30° | 40° |
| Example 2 | Chemical Formula 4 | Mix with positive photosensitive resin 4 | Xylene | 90° C. | 30° | 30° |
| Example 3 | Chemical Formula 5 | Application to pattern 6a | Xylene | 90° C. | 30° | 30° |
| Example 4 | Chemical Formula 4 | Application to pattern 6a | Methyl isobutyl ketone | 90° C. | 30° | 30° |
| Example 5 | Chemical Formula 4 | Application to pattern 6a | Xylene | 70° C. | 40° | 50° |
| Example 6 | Chemical Formula 6 | Application to pattern 6a | Xylene | 90° C. | 40° | 50° |
| Comparative Example 1 | — | — | Xylene | 90° C. | 65° | 65° |
| Comparative Example 2 | Chemical Formula 4 | Immersion of the sample | Xylene | 90° C. | 40° | 65° |

The results shown in Table 3 will be described below.

When the ink jet head was produced by an ink jet head manufacturing method of the related art without performing a hydrophilizing treatment (Comparative Example 1), an initial contact angle of the ink flow path surface was 65°. On the other hand, when the ink jet head was produced by the method of Japanese Patent Application Laid-Open No. 2001-348444 (Comparative Example 2), the initial contact angle was 40° and the effect of hydrophilization was confirmed. However, the contact angle after ink immersion was 65° and the effect of hydrophilization was lost. It is considered that the hydrophilizing material fell from the ink flow path due to the immersion in the ink. In the case of Comparative Example 2, it was confirmed that the compatible layer according to the present invention was not formed.

On the other hand, in Examples 1 to 6 according to the present invention, the initial contact angle was 30° to 40° and the contact angle after the ink immersion was 30° to 50°. Accordingly, the sustainability of the hydrophilicity could be confirmed.

Here, the difference in hydrophilicity in the present example will be described.

First, in Example 6, as the hydrophilizing material, the material of the pattern 6a, that is, the material having a functional group different from that of the poly(methyl isopropenyl ketone) resin was selected. Therefore, the fixability of the hydrophilizing material to the pattern 6a decreased and the hydrophilizing material taken into the compatible layer 7b on the surface of the ink flow path was small. Therefore, it is considered that a contact angle was 40°, which represented a smaller initial hydrophilizing effect than that in the other examples (contact angle of 30°). Further, regarding the fact that the hydrophilicity after immersion in the ink is lower than the initial hydrophilicity, it is considered that although the hydrophilizing material was taken into the compatible layer 7b, the fixability with the material of the pattern 6a was low and thus a part of the hydrophilizing material was fall off by the immersion in the ink.

Next, in Example 1, as the hydrophilizing material, a material having a carbonyl group that the material of the pattern 6a has was selected. Therefore, the fixability of the hydrophilizing material to the pattern 6a was better than that in Example 6. Thus, it is considered that since the amount of the hydrophilizing material taken into the compatible layer 7b on the surface of the ink flow path was larger than that in Example 6, the initial hydrophilizing effect was higher than that in Example 6 and the contact angle was 30°. Further, regarding the fact that the hydrophilicity after immersion in the ink is lower than in the initial stage as in Example 6, it is considered that a part of the hydrophilizing material was fallen from the compatible layer 7b due to the immersion in the ink.

Next, in Example 2, the same hydrophilizing material as in Example 1 was mixed with the material of the pattern 6a. Initially, the contact angle was 30° as in Example 1, but the hydrophilicity was maintained even after the immersion in the ink. The difference from Example 1 is considered that since the hydrophilizing material was mixed in advance with the resin forming the pattern 6a, the fixability of the hydrophilizing material in the compatible layer 7b was strong and the hydrophilizing material did not fall off even when the immersion in ink.

Next, in Example 3, as the hydrophilizing material, a material having an epoxy group, which is a functional group of the flow path forming member 8b, that is, of the negative photosensitive resin layer 8a, was selected. Therefore, it is considered that the fixability of the hydrophilizing material to the flow path forming member 8b was strong, the initial hydrophilicity was high as in Example 2 and the initial hydrophilicity was maintained even after the immersion in the ink.

Next, in Example 4, as the hydrophilizing material, the same material as in Example 1 was used as the material of the pattern 6a, but as the solvent of the negative photosensitive resin layer 8a, a methyl isobutyl ketone that easily dissolves the surface of pattern 6a was used. Therefore, since the compatible layer 7b was formed thicker than that in Example 1, a large amount of hydrophilizing material was present on the surface of the ink flow path. As a result, it is considered that, as in Examples 2 and 3, the initial hydrophilicity was high and the initial hydrophilicity was maintained even after the immersion in the ink.

Finally, in Example 5, as the hydrophilizing material, the same material as in Example 1 was used for the material of the pattern 6a and the baking temperature at the time of applying the negative photosensitive resin layer 8a was set to 70° C. Therefore, since the compatible layer 7b was formed thinner than that in Example 1, it was considered that the small amount of hydrophilizing material were present on the surface of the ink flow path and the hydrophilicity was lower than that in Example 1 both at the initial stage and after the immersion in the ink.

<<Ink Jet Head Evaluation>>

Example 7

The ink jet head shown in FIG. 2 was produced according to the method as described above with reference to FIGS. 3A to 3H.

First, an electrothermal conversion element (heater made of a material $HfB_2$) as the energy generating element 2 and the substrate 1 formed of silicon single crystal having a laminated film (not shown) of SiN+Ta in an ink flow path forming portion were prepared. After applying a poly(methyl isopropenyl ketone) resin solution to the substrate 1 by spin coating, baking was performed at 120° C. for 6 minutes to produce a positive photosensitive resin layer 4 (FIG. 3A). The film thickness of this layer was 10 μm. Thereafter, the Deep-UV exposure device UX-3300 (manufactured by Ushio, Inc.) was used and pattern exposure was performed at an exposure amount of 10 $J/cm^2$ (FIG. 3B). Thereafter, paddle development was performed by a methyl isobutyl ketone for 60 seconds and then shower rinse treatment with isopropyl alcohol was performed for 30 seconds to form the pattern 6a serving as the mold of the ink flow path (FIG. 3C).

Thereafter, a solution obtained by dissolving 1% by mass of a hydrophilizing material represented by Chemical Formula 4 in isopropyl alcohol was applied to the pattern 6a by spin coating and then baking was performed at 90° C. for 3 minutes to fix the hydrophilizing material (FIG. 3D).

Next, in order to form the flow path forming member 8b, the negative photosensitive resin composition shown in Table 1 was applied by spin coating and then baking at 90° C. for 9 minutes was performed to form the negative photosensitive resin layer 8a (FIG. 3E). A film thickness of the negative photosensitive resin layer 8a was 20 μm on the substrate 1 and 10 μm on the pattern 6a.

Next, the negative photosensitive resin layer 8a was patterned using the photomask 9 so as to form the ejection orifice 10 (FIG. 3F). An i-line stepper FPA-3000i5+ manufactured by Canon Inc. was used as the exposure device and pattern exposure was performed at an exposure amount of 5000 $J/m^2$. Thereafter, developing with the methyl isobutyl ketone and rinsing with xylene were performed and then a heat treatment was performed at 100° C. for 60 minutes. As described above, the flow path forming member 8b having the ejection orifice 10 was formed (FIG. 3G).

Next, an etching mask (not shown) was formed on a back surface of the substrate to be processed and the silicon substrate 1 was anisotropically etched to form the supply port 3 for an ink. Thereafter, the entire surface was exposed through the negative resist at an exposure amount of 250,000 $mJ/cm^2$ using the Deep-UV exposure device UX-3300 (manufactured by Ushio, Inc.) to solubilize the pattern 6a. Subsequently, immersion was performed with methyl lactate while applying ultrasonic waves thereto and the flow path 6b for an ink was formed by dissolving and removing the pattern 6a (FIG. 3H).

Further, in order to completely cure the flow path forming member 8b, heat treatment was performed at 200° C. for 1 hour, the member 11 for ink supply was joined. Electrical joining (not shown) for driving the energy generating element 2 was performed to form the ink jet head.

Table 4 shows the result of ink ejection durability test which was performed as an evaluation of the obtained ink jet head and performed by setting the ink jet head obtained above in a printer.

The ink ejection durability test was a continuous printing of 15,000 sheets and the ink impact accuracy before and after the durability test was evaluated according to the following criteria. For the ink, an ink having a composition of pure water/diethylene glycol/isopropyl alcohol/lithium acetate/black dye food black 2=79.4/15/3/0.1/2.5 (mass ratio).

A: Ink landing deviation within 5 μm
B: Ink landing deviation is more than 5 μm to less than 10 μm
C: Ink landing deviation is more than 10 μm

Example 8

A mixed solution of a poly(methyl isopropenyl ketone) resin and the hydrophilizing material represented by Chemical Formula 4 was applied to the silicon substrate 1 by spin coating and then baking was performed at 120° C. for 6 minutes to produce the positive photosensitive resin layer 4. (FIG. 3A). 1% by mass of the hydrophilizing material was added to the poly(methyl propenyl ketone). The film thickness of this layer was 10 Thereafter, the Deep-UV exposure device UX-3300 (manufactured by Ushio, Inc.) was used and pattern exposure was performed at an exposure amount of 15 $J/cm^2$ (FIG. 3B). Thereafter, paddle development was performed with the methyl isobutyl ketone for 60 seconds and then shower rinse treatment with isopropyl alcohol was performed for 30 seconds to form the pattern 6a serving as the mold of the ink flow path (FIG. 3C).

Next, the negative photosensitive resin composition described in Table 1 was applied and then baked at 90° C. for 9 minutes to form the negative photosensitive resin layer 8a (FIG. 3E). A film thickness of the negative photosensitive resin layer 8a was 20 μm on the substrate 1 and 10 μm on the pattern 6a. The subsequent steps are the same as in Example 7.

Example 9

Except that a compound represented by Chemical Formula 5 was used as the hydrophilizing material, the ink jet head was produced and evaluated in the same manner as in Example 7.

Example 10

Except that the resin shown in Table 2 was used as the negative photosensitive resin, the ink jet head was produced and evaluated in the same manner as in Example 7.

Example 11

Except that the baking temperature when forming the negative photosensitive resin layer was set to 70° C. and the contact angle measurement sample was produced and the ink jet head was produced and evaluated in the same manner as in Example 7.

Example 12

Except that a compound represented by Chemical Formula 6 was used as the hydrophilizing material, the ink jet head was produced and evaluated in the same manner as in Example 7.

TABLE 4

| | Addition of hydrophilizing material | | Formation of negative photosensitive resin layer | | Ink impact accuracy |
|---|---|---|---|---|---|
| | Material | Process | Solvent | Baking temperature | |
| Example 7 | Chemical Formula 4 | Application to pattern 6a | Xylene | 90° C. | A |
| Example 8 | Chemical Formula 4 | Mix with positive photosensitive resin 4 | Xylene | 90° C. | A |
| Example 9 | Chemical Formula 5 | Application to pattern 6a | Xylene | 90° C. | A |
| Example 10 | Chemical Formula 4 | Application to pattern 6a | Methyl isobutyl ketone | 90° C. | A |
| Example 11 | Chemical Formula 4 | Application to pattern 6a | Xylene | 70° C. | A |
| Example 12 | Chemical Formula 6 | Application to pattern 6a | Xylene | 90° C. | A |

As shown in Table 4, it was confirmed that the ink jet heads manufactured in Examples 7 to 12 according to the present invention had good ink ejection accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-142721, filed Aug. 2, 2019, and Japanese Patent Application No. 2020-116925, filed Jul. 7, 2020, which are hereby incorporated by reference herein in their entirety.

What is claimed is:

1. A method for manufacturing a liquid ejection head including an ejection orifice for ejecting a liquid, a substrate on which an energy generating element for ejecting the liquid is formed, and a flow path forming member that is joined to the substrate to form a liquid flow path communicating with the ejection orifice and having the energy generating element therein, the method comprising:

(1) forming a resin layer comprising a first resin having a pattern serving as a mold of the liquid flow path, on the substrate on which the energy generating element is formed;

(2) adding a hydrophilizing material represented by chemical formula 1 to an entire surface layer of the resin layer:

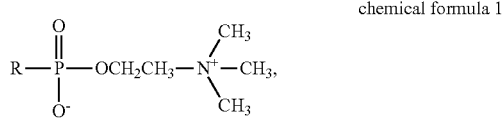

chemical formula 1 where R represents a hydrocarbon group, which optionally contains at least one selected from the group consisting of an O atom and an N atom;

(3) forming a covering resin layer comprising a second resin serving as the flow path forming member, on the resin layer, and forming a compatible layer containing the first resin, the second resin, and the hydrophilizing material, at an interface between the resin layer and the covering resin layer;

(4) forming the ejection orifice in the covering resin layer; and (5) forming the liquid flow path by removing the resin layer.

2. The method according to claim 1, wherein the resin layer is impregnated with the hydrophilizing material using a solvent.

3. The method according to claim 1, wherein R in the hydrophilizing material has a same functional group as a functional group of the first resin.

4. The method to claim 1, wherein the first resin is a poly(methyl isopropenyl ketone).

5. The method to claim 1, wherein R in the hydrophilizing material has a carbonyl group.

6. The method according to claim 1, wherein R in the hydrophilizing material has a same functional group as a functional group of the second resin.

7. The method according to claim 1, wherein the second resin is a photocurable epoxy resin.

8. The method according to claim 1, wherein R in the hydrophilizing material has an epoxy group.

9. A method for manufacturing a liquid ejection head including an ejection orifice for ejecting a liquid, a substrate on which an energy generating element for ejecting the liquid is formed, and a flow path forming member that is joined to the substrate to form a liquid flow path communicating with the ejection orifice and having the energy generating element therein, the method comprising:

(1) forming a resin layer having a pattern serving as a mold of the liquid flow path and comprising a first resin and a hydrophilizing material represented by chemical formula 1, on the substrate on which the energy generating element is formed:

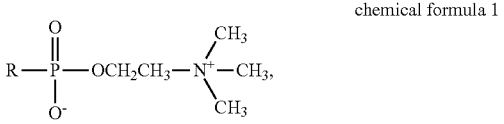

chemical formula 1 where R represents a hydrocarbon group, which optionally contains at least one selected from the group consisting of an O atom and an N atom;

(2) forming a covering resin layer comprising a second resin serving as the flow path forming member, on the resin layer, and forming a compatible layer containing the first resin, the second resin, and the hydrophilizing material, at an interface between the resin layer and the covering resin layer;

(3) forming the ejection orifice in the covering resin layer; and (4) forming the liquid flow path by removing the resin layer.

\* \* \* \* \*